US006800265B2

United States Patent
Mori et al.

(10) Patent No.: US 6,800,265 B2
(45) Date of Patent: Oct. 5, 2004

(54) METHOD FOR TREATING A GAS CONTAINING A BORIC ACID COMPONENT

(75) Inventors: Yoichi Mori, Kumamoto (JP); Hachiro Hirano, Tokyo (JP); Kazutaka Ohtsuka, Kanagawa (JP); Itsuo Mochizuki, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 239 days.

(21) Appl. No.: 10/237,699

(22) Filed: Sep. 10, 2002

(65) Prior Publication Data
US 2004/0047782 A1 Mar. 11, 2004

(51) Int. Cl.$^7$ .......... C01B 35/10; C01B 35/00; B01J 8/00
(52) U.S. Cl. .......... 423/278; 423/210; 423/276; 423/277
(58) Field of Search .......... 423/210, 276, 423/277, 278

(56) References Cited

U.S. PATENT DOCUMENTS

| | | | |
|---|---|---|---|
| 3,880,629 A | * | 4/1975 | Dulin et al. .......... 65/27 |
| 3,995,005 A | | 11/1976 | Teller |
| 4,265,871 A | * | 5/1981 | Felice et al. .......... 423/531 |
| 4,282,019 A | | 8/1981 | Dunn et al. |
| 4,631,178 A | | 12/1986 | Rapp et al. |
| 5,651,949 A | * | 7/1997 | Fisher et al. .......... 423/278 |
| 6,352,653 B1 | | 3/2002 | Hirano et al. |

FOREIGN PATENT DOCUMENTS

EP    0 395 789    11/1990

* cited by examiner

Primary Examiner—Stanley S. Silverman
Assistant Examiner—Jonas N. Strickland
(74) Attorney, Agent, or Firm—Oblon, Spivak, McClelland, Maier & Neustadt, P.C.

(57) ABSTRACT

A method for treating a gas, which comprises contacting a gas containing a boric acid component in an amount of at least 15 mg/m$^3$ as converted into $B_2O_3$ concentration in a standard state, with a solid alkali metal carbonate material comprising at least one member selected from the group consisting of alkali metal carbonates and alkali metal hydrogencarbonates, to remove the boric acid component from the gas.

10 Claims, 1 Drawing Sheet

METHOD FOR TREATING A GAS CONTAINING A BORIC ACID COMPONENT

Figure 1:
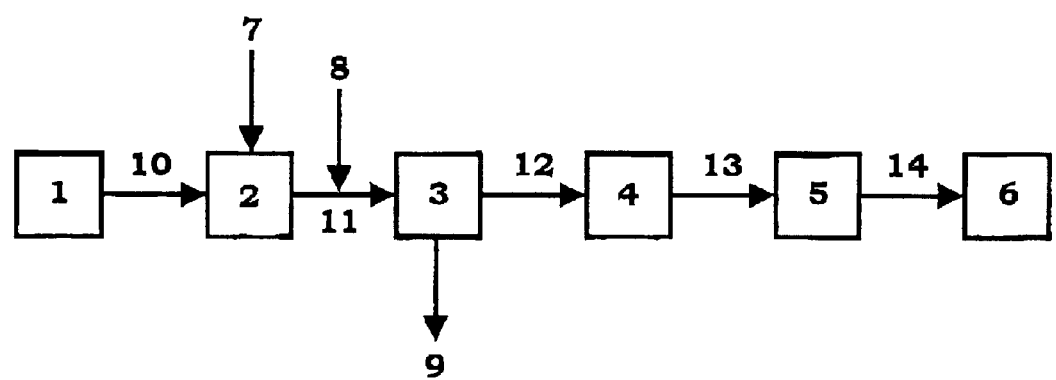

The present invention relates to a method for efficiently removing a boric acid component from a gas containing the boric acid component.

Heretofore, borax or boric acid has been used as a raw material in e.g. the production of borosilicate glass, the production of a glaze or the production of enameled products, whereby a boric acid component will be contained in e.g. an exhaust gas from a glass melting furnace or in an exhaust gas from an enameling furnace and will be a cause for air pollution. Further, in a coal fired power plant, etc., a boric acid component is contained in the coal as the fuel, and accordingly, the boric acid component will be contained in the exhaust gas and will be a cause for air pollution. Such a boric acid component discharged to an environment is known to be a cause for pollution of water or soil.

For example, in a glass melting process employing borax, boric acid will be included in the exhaust gas. Boric acid is known to have a molecular structure shown by a compositional formula of $H_3BO_3$, $HBO_2$, $B_2O_3$ or the like (hereinafter referred to as the boric acid component), depending upon the temperature and partial pressure of water vapor.

Heretofore, there have been no effective methods capable of effectively removing such a boric acid component. It has been common to employ a wet scrubber wherein an alkali substance such as a sodium hydroxide solution is used, a method wherein calcium hydroxide powder is applied to a gas flue and then, the acid component is removed together with the calcium hydroxide powder by means of a bag filter or an electric dust collector, or a method wherein the gas containing fine particles of boric acid formed, is strictly filtered by microfiltration. However, the content of the boric acid component was not adequately reduced by such removal treatment, and none of such methods was thus adequate as a removal method.

Further, for example, in the wet scrubber or the like, if the amount of circulating the alkali solution is increased to improve the efficiency for the removal of the boric acid component, the exhaust gas temperature decreases, and if the exhaust gas temperature becomes lower than the acid dew-point, the $SO_3$ gas or sulfuric acid gas (hereinafter referred to as the $SO_3$ component) in the gas will be sulfuric acid mist, whereby corrosion is likely to be led. Further, if the alkali concentration in the circulating liquid is increased, the concentrations of sodium carbonate, sodium sulfate and sodium borate in the reaction product will increase, and crystals are likely to precipitate, which may lead to clogging of the circulating pipe line. On the other hand, in the method of injecting fine powder of calcium hydroxide into the gas to be treated, the reactivity between calcium hydroxide and the boric acid component is low, and it will be necessary to use a large amount of the fine powder of calcium hydroxide, whereby the installation will be obliged to be large-sized, and further, disposal of the reaction product and the non-reacted solid waste will be required, thus leading to a problem of large costs. Further, in the method of gas microfiltration, it is necessary to cool the gasified boric acid component to change solid phase for sufficient removal of the boric acid component, whereby the temperature will be lower than the acid dew-point such as sulfuric acid or hydrochloric acid, and accordingly, it will be necessary to install a special very expensive bag filter.

The present invention provides a method for treating a gas, which comprises contacting a gas containing a boric acid component in an amount of at least 15 mg/m³ as converted into $B_2O_3$ concentration in a standard state, with a solid alkali metal carbonate material comprising at least one member selected from the group consisting of alkali metal carbonates and alkali metal hydrogencarbonates, to remove the boric acid component from the gas.

By the present invention, the boric acid component in a gas which used to be difficult to remove, can be efficiently removed. Further, in the present invention, a conventional dry-type exhaust gas treating installation such as a powder spraying apparatus or a bag filter, can be employed as it is.

Further, the present invention provides an improved method for operation of a denitrizer or a method of effectively utilizing the boron compound in an exhaust gas, which used to be disposed.

In the accompanying drawing, FIG. 1 is a flow chart showing the method for treating a gas containing a boric acid component, discharged from a glass melting furnace.

In the figure, reference numeral 1 indicates a melting furnace for a glass containing a boric acid component, 2 a stabilizer, 3 a bag filter, 4 an exhaust fan, 5 a denitrizer, 6 a chimney, 7 alkaline solution, 8 a sodium hydrogencarbonate powder in Example 1, or a calcium hydroxide powder in Example 2, 9 a collected dust, 10 a first gas flue, 11 a second gas flue, 12 a third gas flue, 13 a fourth gas flue, and 14 a fifth gas flue.

Now, the present invention will be described in further detail with reference to the preferred embodiments.

In the present invention, the gas containing a boric acid component (hereinafter referred to as the gas to be treated) may, for example, be a gas discharged from a heating process or a melting process of a glass or other inorganic material containing a boric acid component. For example, it may be a gas containing a boric acid component, such as an exhaust gas produced during the production of a heat resistant borosilicate glass, a glass wool heat insulation material, a glass fiber, a glass for liquid crystal displays, a frit glaze, ferroboron or a porcelain, or a gas from other manufacturing or treating process. In this specification, the boric acid component is meant for $H_3BO_3$ or its dehydrates and primarily for $H_3BO_3$, $HBO_2$ or $B_2O_3$. The concentration of the boric acid component is one as converted into $B_2O_3$. Further, the method of the present invention is effective also for the removal of an acidic gas other than boric acid component in general, and in a case where an acidic gas such as boron trifluoride ($BF_3$), boron trichloride ($BCl_3$), hydrogen chloride (HCl), sulfur dioxide ($SO_2$), sulfur trioxide ($SO_3$), sulfur acid ($H_2SO_4$), hydrogen fluoride (HF), hydrogen bromide (HBr) or hydrogen iodide (HI) is contained in the gas to be treated, containing a boric acid component, such an acidic gas can also be removed simultaneously.

In the present invention, the amount of the boric acid component in the gas to be treated, is at least 15 mg/m³ as converted into $B_2O_3$ concentration in a standard state. However, even if the amount of the boric acid component in the gas to be treated is less than 15 mg/m³ as converted into $B_2O_3$ concentration, there will be no change in the effectiveness of the present invention.

In the present invention, the solid alkali metal carbonate material is, for example, applied in the gas to be treated and uniformly dispersed to contact and neutralize a gaseous boric acid component for removal of the boric acid component. In a case where the gas to be treated contains also an acid other than boric acid (such as sulfuric acid), the gas to be treated is preferably at a temperature higher than the dew-point of such an acid. In another embodiment, the solid alkali metal carbonate material may be granulated into pellets, spheres or aggregates, and such a granulated product may be used as a packing bed. In a case where an exhaust gas at a high temperature is treated in a large amount, it is preferred to employ a method of applying a powder of the solid alkali metal carbonate material to the exhaust gas flue.

In the present invention, as the solid alkali metal carbonate material, any such material may be employed so long as it is capable of removing the boric acid component by a neutralizing reaction. The solid alkali metal carbonate material is preferably an anhydrous salt in that the amount of the gas to be treated per mass, can be thereby increased. However, a hydrous salt may likewise be used.

As the alkali metal hydrogencarbonate, sodium hydrogencarbonate is particularly preferred, since it is available inexpensively in a large amount, it is free from hygroscopicity, it is easy to prepare and store its granulated product, it can easily be pulverized to have a very fine particle size, and it can be converted to porous (not less than 1 $m^2/g$) sodium carbonate by calcination whereby high reaction rate with boric acid component is achieved. In a case where use of sodium should be avoided, for example, in purification of a process gas, potassium hydrogencarbonate may be employed.

Further, as the alkali metal carbonate material, sodium carbonate or potassium carbonate may, for example, be used. Sodium carbonate is preferred, since it is available inexpensively in a large amount. When use of sodium should be avoided, it is preferred to employ potassium carbonate. As the sodium carbonate, porous sodium carbonate so-called light ash is particularly preferred, since it has a large specific surface area and can easily be finely pulverized.

When the porous sodium carbonate is light ash, the surface area is preferably at least 1 $m^2/g$. In the present specification, the term surface area referrers to BET surface area. Other than being porous, the specific surface area can be increased by reducing the mean particle diameter. Accordingly, even with sodium carbonate so-called dense ash which is not porous, the specific surface area can be made to be at least 1 $m^2/g$, by finely pulverizing it, whereby the reactivity can be improved. The light ash can be readily pulverized and is porous, and thus it has a merit in that the specific surface area is large, and high performance can be obtained. Whereas, the dense ash has a merit in that it is usually readily available, and the transportation cost is low, since bulkiness is low.

These solid alkali metal carbonate materials may be used alone respectively, or in combination as a mixture. Further, as will be described hereinafter, as the solid alkali metal carbonate material or an anticaking agent to be added to improve the flowability of the powder or to prevent caking, any material or agent may be used irrespective of a natural product or a synthetic product. Further, when sodium carbonate or potassium carbonate is used as the solid alkali metal carbonate material, such a material is highly hygroscopic, and it is preferred to package it with a packaging material treated for water vaporproofing, in order to store it in a packaged form for a long period of time. As a specific packaging material, one having a water vapor permeability of not more than 5 $g/m^2 \cdot day$ at 40° C., as prescribed in JIS-Z0208, is preferred. This water vapor permeability is one obtained in such a manner that with the packaging material being a partition, one side thereof is maintained to be an air having a relative humidity of 90% and the other side is maintained to be in a dried state by calcium chloride, and upon expiration of 24 hours, the mass of water vapor passed through the partition is calculated per unit area of the packaging material. The water vapor permeability is particularly preferably not more than 1 $g/m^2 \cdot day$ at 40° C.

As the solid alkali metal carbonate material, it is preferred to use one having a volume mean particle diameter of from 1 to 100 $\mu m$, whereby the specific surface area of particles of the solid alkali metal carbonate material will be large, and the reactivity with the boric acid component will be high, which will be effective for the removal of the boric acid component. Further, the number of particles per unit mass will be increased, whereby the number density in the gas to be treated will be high, and the diffusion length of the boric acid component from the particles in the exhaust gas flue can be shortened, and the reactivity will accordingly be high, such being desirable. The lower limit of the mean particle diameter is not particularly limited from the viewpoint of the effect for the removal of the boric acid component. However, if the mean particle diameter is less than 1 $\mu m$, it tends to be difficult to produce such small particles industrially by a pulverization operation, such being undesirable.

If the mean particle diameter exceeds 0.1 $\mu m$, when applied to the exhaust gas flue, they tend to precipitate at the bottom portion of the exhaust gas flue without being sufficiently reacted. The mean particle diameter is preferably at most 50 $\mu m$, more preferably at most 30 $\mu m$, most preferably at most 20 $\mu m$.

In the present invention, the mean particle diameter is determined in such a manner that the particle size distribution is measured by a laser diffraction scattering particle size distribution measuring apparatus, and a cumulative curve is obtained with the total volume being 100%, whereby the particle diameter at a point where the cumulative volume is 50%, is taken as the mean particle diameter ($\mu m$).

The amount of the solid alkali metal carbonate material applied to the gas to be treated is preferably from 0.5 to 50 mols per mol of $B_2O_3$ when the boric acid component in the gas is converted into $B_2O_3$ concentration (for example, sodium hydrogencarbonate is converted into $NaHCO_3$ concentration, and sodium carbonate is converted into $Na_2CO_3$ concentration, to obtain the respective mols). If the amount applied is less than 0.5 mol, the amount is less than equivalent when reacted with the boric acid component, whereby the amount of reduction of the boric acid component will be inadequate, such being undesirable. If the amount applied exceeds 50 mols, the cost will be too high, such being undesirable. Further, the exhaust gas contains an acidic gas such as sulfur oxide, hydrogen chloride or hydrogen fluoride in many cases, and the solid alkali metal carbonate material of the present invention will also be reacted with such an acidic gas at a high reaction rate and will be thereby consumed. Accordingly, it is preferred to use the above application in combination with a wet scrubber of sodium hydroxide or with application of calcium hydroxide powder to remove such other acidic gas, so that the above-mentioned amount can further be reduced.

The method for applying the solid alkali metal carbonate material to the gas to be treated may, for example, be a method of spraying it into e.g. the exhaust gas flue by e.g. air transportation, a method of spraying it while aspirating the powder by a compressed gas by means of an ejector, or a method of pulverizing it immediately before use, as described hereinafter, i.e. directly spraying it from the discharge outlet of the pulverizer.

For the removal of the solid alkali metal carbonate material applied to the gas to be treated, it is possible to use an instrument such as an electric dust collector, a bag filter, a venturi scrubber or a packed tower.

By the method of the present invention, the concentration of the boric acid component in the gas to be treated, can be reduced to a level of less than 60 mass %, preferably less than 50 mass %, of the amount before the treatment, as converted into $B_2O_3$ concentration in a standard state.

In a case where the solid alkali metal carbonate material is large particles and will be pulverized for use, the method of adjusting the mean particle size may, for example, be a method of pulverizing the large particles immediately before the application to e.g. the exhaust gas flue (hereinafter referred to as the on-site pulverization method) or a method of pulverizing the large particles in advance and storing the pulverized particles in a storage tank till the actual use (hereinafter referred to as the preliminary pulverization method).

In the on-site pulverization method, large particles are stored in a storage tank, and immediately before use, they are supplied in a constant amount to a pulverizer, pulverized and applied immediately to e.g. the exhaust gas flue. As the pulverizer, an impact type grinder (a grinder which utilize a pin or a blade rotating at a high speed) or a jet mill (a grinder which utilize an impact air current), may, for example, be mentioned. In order to efficiently pulverize the material to a mean particle diameter of at most 20 μm, it is preferred to use a pulverizer equipped with a classifying mechanism. Further, to increase the reactivity with the boric acid component, it is preferred to pulverize and classify the solid alkali metal carbonate material so that the 90% diameter in the minus sieve cumulative particle size distribution of particles would be at most 60 μm, before spraying it into the gas to be treated. The 90% diameter is particularly preferably at most 30 μm. As the classifier, a pneumatic classifier may, for example, be used. As the pulverizer, a dry impact pulverizer manufactured by HOSOKAWA MICRON CORPORATION (ACM pulverizer, trade name) may, for example, be preferably employed, since it has a built-in pneumatic classifying mechanism.

In the preliminary pulverizing method, large particles are pulverized to a necessary mean particle diameter in advance, and the pulverized particles are stored in a storage tank and, at the time of use, applied to e.g. the exhaust gas flue. As the pulverizer to be used here, in addition to the one mentioned above, a pulverizer of a medium system, such as a ball mill, a vibrating mill or a media agitating mill, may also be used. Further, a method may also be employed in which pulverization is carried out by means of a wet pulverizer e.g. an agitator bead mill, followed by drying.

In general, the on-site pulverization method is suitable for a large amount application where a pulverization installation for the exclusive use can be installed, while the preliminary pulverization method is suitable for a small amount application where pulverization can more efficiently be carried out at other site or in a case where the material is finely pulverized to a level of less or equal 10 μm to remove the boric acid component to a higher degree.

The starting material to be pulverized is preferably one having a mean particle diameter of from 50 to 500 μm. If the mean particle diameter is less than 50 ∞m, it tends to be difficult to constantly supply it to the pulverizer, and if the mean particle diameter exceeds 500 μm, the installation of the pulverizer to pulverize it to a level of at most 20 μm, will be excessive, such being undesirable.

In the preliminary pulverization method, it may happen that the pulverized product will agglomerate during the storage, or it tends to be difficult to supply the pulverized product in a constant amount to e.g. the exhaust gas flue, at the time of use. Accordingly, it is preferred to pulverize the material to be pulverized, together with an anticaking agent or to add an anticaking agent after the pulverization.

The anticaking agent will be present among the particles of the solid alkali metal carbonate material to prevent direct contact of the particles of the solid alkali metal carbonate material one another thereby to prevent caking and/or agglomeration of the particles of the solid alkali metal carbonate material. Accordingly, addition of the anticaking agent may be applied also to the on-site pulverization method, since agglomeration may be prevented during the pulverization of the solid alkali metal carbonate material or during the application of the pulverized powder of the solid alkali metal carbonate material.

The mean particle diameter of the anticaking agent is preferably from 0.005 to 5 μm. If the mean particle diameter of the anticaking agent is less than 0.005 μm, the anti-caking effect cannot be further increased, and such cannot be available as an inexpensive industrial product, such being undesirable. On the other hand, if the mean particle diameter exceeds 5 ∞m, even if the same proportion by mass as in the case of fine particles, is added, the number of particles of the anticaking agent will be small, whereby the anticaking effect will decrease, such being undesirable. The mean particle diameter of the anticaking agent is more preferably from 0.005 to 2 ∞m, most preferably from 0.005 to 0.1 ∞m.

The anticaking agent may be one commonly known as a material to be added for the purpose of preventing caking or improving the flowability of a powder, such as magnesium carbonate, silica, alumina, aluminosilicate, zeolite, talc or a stearic acid salt. A plurality of materials may be used in combination. Among them, silica is preferred, and among silicas, fumed silica is particularly preferred from the viewpoint of e.g. the fine mean particle diameter, the anticaking effect, increase of the flowability and availability.

When fumed silica is used, hydrophilic fumed silica excellent in dispersibility in water, is preferred, depending upon the operating procedure of the application of the solid alkali metal carbonate material. Although even with hydrophobic fumed silica, the effect for improving the flowability of the solid alkali metal carbonate material may be good, when, for example, the solid alkali metal carbonate material and its anticaking agent are applied at an upstream of a wet desulfurizer, the hydrophobic fumed silica will be agglomerated in the absorption tower of the exhaust gas desulfurizer to form a film at the gas-liquid boundary layer, and if air is included in the film by stirring or mixing, bubbles will not diminish, and foaming may likely to result. Further, also at the time of disposing the solid alkali metal carbonate material after the reaction, by dissolving it in water, hydrophilic fumed silica is likewise preferred.

Fumed silica naturally has hydrophilicity unless it is subjected to hydrophobic treatment and can suitably be used as an anticaking agent. The hydrophilic fumed silica will not float on water and will be dispersed in water, whereby no trouble of foaming as described above will result. On the other hand, in a process wherein an electric dust collector is installed between the exhaust gas desulfurizer and the position at which the solid alkali metal carbonate material and its anticaking agent are applied, no trouble of foaming as mentioned above will result, whereby the anticaking agent may be used irrespective of whether it is hydrophobic or hydrophilic.

Further, zeolite may also be preferably employed as the anticaking agent. Although zeolite is inferior to fumed silica in the effectiveness as an anticaking agent, it has an effect to react and neutralize the acidic component in the gas to be treated and thus is preferably employed. Especially a synthetic zeolite so-called 4A zeolite is particularly preferred since its mean particle diameter is as small as from 1 to 5 μm, and it contains sodium and thus has an action to neutralize the acidic component. Further, a powder obtained by drying this zeolite can be used also as a desiccant, whereby it is capable of suppressing caking or agglomeration due to moisture absorption by the fine particles of the solid alkali metal carbonate material. Further, it is more effective to use it in combination with fumed silica. Especially when sodium carbonate is used as the solid alkali metal carbonate material, it is preferably used, since it is capable of preventing caking or preventing formation of monohydrate due to moisture absorption by sodium carbonate.

In the present invention, the anticaking agent is preferably incorporated in an amount of from 0.1 to 5 mass %, based on the solid alkali metal carbonate material. If the amount is less than 0.1 mass %, the effect to increase the flowability of the solid alkali metal carbonate material tends to be low, such being undesirable. On the other hand, if the amount exceeds 5 mass %, the effect to increase the flowability of the solid alkali metal carbonate material will no longer be improved in proportion to the added amount, and the cost tends to be high, such being undesirable. The amount is particularly preferably from 0.3 to 2 mass %.

As a method for preventing caking and increasing the flowability of the solid alkali metal carbonate material, it is preferred to add coarse particles of the solid alkali metal carbonate material having a mean particle diameter exceeding 20 $\mu$m, particularly at least 50 $\mu$m, to a fine powder of the solid alkali metal carbonate material having a mean particle diameter of at most 20 $\mu$m. It is thereby possible to improve ease of discharge of the fine powder from the storage tank as described hereinafter, in a case where a fine powder of the solid alkali metal carbonate material is stored in a storage tank for a while and then used for treatment of the gas, by the preliminary pulverization method. Namely, the large coarse particles will disintegrate caking weakly formed by the fine particles, by their weight and size.

It is also possible to treat the gas by adding both the anticaking agent and the above-mentioned coarse particles to the fine powder of the solid alkali metal carbonate material having a mean particle diameter of at most 20 $\mu$m. With respect to the amount of the coarse particles mixed, it is effective to mix them in an amount of from 10 to 30 mass % of whole the solid alkali metal carbonate material having an average particle diameter of at most 20 $\mu$m and the coarse particles. For example, in a case where the solid alkali metal carbonate material is sodium hydrogencarbonate or sodium carbonate, it is possible to use as the coarse particles, sodium hydrogencarbonate or sodium carbonate, respectively.

By mixing the coarse particles in the proportion as mentioned above, it is possible to prevent a phenomenon so-called a rat hole, wherein only the central portion of the powder in the storage tank will be discharged, and the powder at the portion in the vicinity of the wall will remain. Such an effect can be obtained by physically mixing the coarse particles. However, taking into consideration the effect for the removal of the boric acid component, it is preferred to use coarse particles of the solid alkali metal carbonate material itself, so that the coarse particles themselves will also contribute to the removal of the boric acid component to some extent.

In the method for treating the gas of the present invention, it is preferred that after the removal of the boric acid component, an exhaust gas desulfurizer is used. By using the exhaust gas desulfurizer, $SO_2$ component in the gas can efficiently be removed.

The method of the present invention is a dry system wherein a powder of the solid alkali metal carbonate material is applied to the gas to be treated, whereby as is different from the wet system, maintenance of the apparatus and the operation is easy, and the operation can be carried out under a stabilized condition. Further, the neutralized residue and a non-reacted material are water-soluble as is different in a case where calcium hydroxide, calcium carbonate or magnesium hydroxide, is, for example, used, and they can be dissolved in water, and boric acid can be removed by a known waste water treatment, whereby the solid waste can be reduced.

In the present invention, after the treatment with the solid alkali metal carbonate material, the gas to be treated may be treated by an exhaust gas desulfurizer or an exhaust gas denitrizer.

In the present invention, particularly when sodium hydrogencarbonate, potassium hydrogencarbonate, light ash or potassium carbonate is employed in the treatment of the gas to be treated by an exhaust gas denitrizer, the $SO_x$ concentration at the inlet of a denitration catalyst bed containing e.g. $V_2O_5$ as the active ingredient, can be reduced to a level of at most 10 ppm, preferably at most 5 ppm, whereby the catalyst life can be prolonged, because it is thereby possible to prevent formation of $NH_4HSO_4$ by a reaction of $SO_3$ with $NH_3$ to be used for denitration.

Further, in the present invention, the exhaust gas from the glass melting process, to be used as a part of raw materials for the boric acid component, is treated with the solid alkali metal carbonate material, then the alkali metal borate formed by the treatment is collected by a dust collector e.g. a bag filter, and the alkali metal borate can be recycled to the melting process for use as a part of the starting materials. Here, in a case where the reaction product of the solid alkali metal carbonate material collected by e.g. a bag filter, contains reaction products of an acidic gases other than boric acid and the solid alkali metal carbonate material, taking the composition into consideration, incorporation of the other starting materials is adjusted, and it will be used for the melting process as a composition to prepare glass.

EXAMPLES

To confirm the performance for the removal of the boric acid component in a gas, by the addition of sodium hydrogencarbonate, a test of applying a powder of sodium hydrogencarbonate to the real exhaust gas from a glass melting furnace, containing boric acid, was carried out.

Now, Examples of the present invention will be described with reference to FIG. 1.

An exhaust gas of about 500° C. formed in a melting furnace 1, is sent to a stabilizer 2 via a first gas flue 10. Here, alkaline solution 7 is infused, $SO_2$, etc. are removed, and the gas temperature is lowered to about 200° C. Then, to the exhaust gas, a sodium hydrogencarbonate powder 8 is sprayed in a second gas flue 11 between the stabilizer 2 and a bag filter 3, whereby the boric acid component and $SO_2$ are treated for neutralization. Then, the exhaust gas containing the sodium hydrogencarbonate is sent to a bag filter 3, where together with a dust, reaction products of sodium hydrogencarbonate and $SO_2$ or boric acid component which remained without being removed in the stabilizer 2, are further reacted and removed. A dust 9 collected by the bag filter 3 is discharged out of the system. On the other hand, the exhaust gas passed through the bag filter 3 is sent to an exhaust fan 4 via a third gas flue 12, then sent to a denitrizer 5 via a fourth gas flue 13, further sent to a chimney 6 via a fifth gas flue 13 and discharged from the chimney 6.

The type of the melt furnace for a glass containing a boric acid component, is an open hearth furnace equipped with a recuperator, whereby the heavy oil consumption is 450 l/h, the exhaust gas flow rate is about 8,000 m$^3$/h, and the boric acid component in the exhaust gas from the furnace, is about 600 mg/m$^3$ as converted into $B_2O_3$ concentration. Here, l means litter as a unit of the volume, and the volume of the gas is a volume in a standard state.

In FIG. 1, the exhaust gas from the third gas flue 12 at the outlet of the bag filter 3, was sampled, and the boric acid component contained in the exhaust gas was fixed by an extraction thimble and water absorption, whereupon the boric acid component was analyzed by an ICP emission spectrometry (inductively coupled plasma emission spectrometry) and converted into $B_2O_3$ concentration.

In the Examples, the mean particle diameter was measured by means of Microtrac FRA 9220, manufactured by Nikkiso Co., Ltd. Further, as the ICP emission spectrometry apparatus, SPS 4000, manufactured by Seiko Instruments Inc., was used.

Example 1 (Present Invention)

Sodium hydrogencarbonate (manufactured by Asahi Glass Co., Ltd.) having a mean particle diameter of 102 μm was pulverized by a pulverizer (ACM pulverizer, trade name for a dry system pulverizer manufactured by HOSOKAWA MICRON CORP.) to obtain a sodium hydrogencarbonate powder having a mean particle diameter of 9 μm and a particle diameter at 90% of cumulative undersize distribution of 19 μm. Here, at the time of pulverization, hydrophilic fumed silica (AEROSIL-R90G, trade name, manufactured by Nippon Aerosil Co., Ltd.) having a mean particle diameter of 0.01 μm was added and mixed in an amount of 1.0 mass %, based on the sodium hydrogencarbonate powder.

The results in the case where the sodium hydrogencarbonate powder was sprayed, are shown in Table 1. The amount of the sodium hydrogencarbonate applied was represented by mols per mol of $B_2O_3$.

Further, the composition of the exhaust gas from the chimney was such that in a case where the fine powder of sodium hydrogencarbonate as a solid alkali metal carbonate material was not applied, $O_2$ was 10 vol %, and $SO_2$ was 15 vol ppm.

TABLE 1

| No. | Amount of sodium hydrogencarbonate applied (mols) | Concentration as converted into $B_2O_3$ concentration (mg/m³) | | $B_2O_3$ remaining ratio (mass %) |
|---|---|---|---|---|
| | | Blank | During spraying | |
| 1-1 | 15 | 82 | 39 | 48 |
| 1-2 | 25 | 75 | 14 | 18 |

Further, in the fourth gas flue 13 at the outlet of the exhaust fan 4, the progress of $SO_2$ concentration was recorded by a continuous automatic analyzer, whereby it decreased from 15 vol ppm to 3 vol ppm, thus showing a drastic effect on the removal of $SO_2$. This decrease of $SO_2$ concentration achieves extension of life of the catalyst (containing $V_2O_5$ as the active ingredient) of the denitrizer 5. Further, by the spraying of the sodium hydrogencarbonate powder, there was no influence over the conventional installation such as the bag filter 3.

Example 2 (Comparative Example)

The test was carried out in the same manner as in Example 1 except that in Example 1, instead of sodium hydrogencarbonate, calcium hydroxide having a mean particle diameter of 4 μm and a particle diameter at 90% of cumulative undersize distribution of 33 μm, was used. The results are shown in Table 2.

Further, the composition of the exhaust gas from the chimney during the test was such that in a case where calcium hydroxide was not applied, $O_2$ was 10 vol %, and $SO_2$ was 15 vol ppm.

TABLE 2

| No. | Amount of calcium hydroxide applied (mols) | Concentration as converted into $B_2O_3$ concentration (mg/m³) | | $B_2O_3$ remaining ratio (mass %) |
|---|---|---|---|---|
| | | Blank | During spraying | |
| 2-1 | 20 | 71 | 58 | 82 |
| 2-2 | 25 | 75 | 46 | 61 |

Further, in the same manner as in Example 1, the progress of $SO_2$ concentration was recorded, whereby it changed from 15 vol ppm to about 12 vol ppm, thus showing no remarkable decrease. Further, by the application of calcium hydroxide, there was no influence over the conventional installation such as a bag filter 3.

What is claimed is:

1. A method for treating a gas, which comprises contacting a gas containing a boric acid component in an amount of at least 15 mg/m³ as converted into $B_2O_3$ concentration in a standard state, with a solid alkali metal carbonate material comprising at least one member selected from the group consisting of alkali metal carbonates and alkali metal hydrogencarbonates, to remove the boric acid component from the gas.

2. The method for treating a gas according to claim 1, wherein the gas containing a boric acid component is contacted with the solid alkali metal carbonate material, so that the boric acid component in the gas becomes to be less than 60 mass % of the amount before the treatment, as converted into $B_2O_3$ concentration in a standard state.

3. The method for treating a gas according to claim 1, wherein the solid alkali metal carbonate material has a volume mean particle diameter of from 1 to 100 μm.

4. The method for treating a gas according to claim 1, wherein the solid alkali metal carbonate material is sodium carbonate.

5. The method for treating a gas according to claim 4, wherein the sodium carbonate is light ash having a specific surface area of at least 1 m²/g.

6. The method for treating a gas according to claim 1, wherein the solid alkali metal carbonate material is sodium hydrogencarbonate.

7. The method for treating a gas according to claim 1, wherein the gas containing a boric acid component, is a gas discharged from a glass heating process or a glass melting process.

8. The method for treating a gas according to claim 1, wherein the gas containing a boric acid component is, after the treatment with the solid alkali carbonate material, treated in an exhaust gas desulfurizer.

9. The method for treating a gas according to claim 1, wherein the gas containing a boric acid component is, after the treatment with the solid alkali carbonate material, treated in an exhaust gas denitrizer.

10. The method for treating a gas according to claim 1, wherein after the treatment of the gas containing a boric acid component with the solid alkali metal carbonate material, an alkali metal borate formed by the treatment, is recycled to a glass melting process for use as a starting material for the boric acid component.

* * * * *